C. B. PRICE.

STREET CAR.

APPLICATION FILED JUNE 18, 1909.

Reissued Aug. 3, 1909.

13,003.

2 SHEETS—SHEET 1.

Witnesses

J. G. Stuckel

J. J. McCarthy

Inventor

Charles B. Price by Foster Freeman Watson & Coit

Attorneys

C. B. PRICE.

STREET CAR.

APPLICATION FILED JUNE 18, 1909.

Reissued Aug. 3, 1909.

13,003.

2 SHEETS—SHEET 2.

Witnesses

J. G. Stinkel

J. J. McCarthy.

Inventor

Charles B. Price by Foster Freeman Watson & Coit

Attorneys

UNITED STATES PATENT OFFICE.

CHARLES B. PRICE, OF PITTSBURG, PENNSYLVANIA.

STREET-CAR.

No. 13,003. Specification of Reissued Letters Patent. Reissued Aug. 3, 1909.

Original No. 770,107, dated September 13, 1904, Serial No. 187,186. Application for reissue filed June 18, 1909. Serial No. 503,023.

*To all whom it may concern:*

Be it known that I, CHARLES B. PRICE, a citizen of the United States, residing at Pittsburg, in the county of Allegheny and State of Pennsylvania, have invented certain new and useful Improvements in Street-Cars, of which the following is a specification.

My present invention comprises a street car in which the ordinary platforms are dispensed with and a receiving compartment provided, which preferably consists of a corridor extending along one side of the car and leading from an entrance door to a station arranged to be occupied by the conductor, who can thus receive, or supervise the reception of, the fares of passengers as they enter the body of the car. A registering turnstile is preferably used at the conductor's station to register the number of passengers entering the car as a check upon the receipts turned in by the conductor, but in some instances this turnstile may be dispensed with, as it is not essential to the operation of other features of my invention. I preferably arrange the outlet or exit door of the car so that the conductor may readily supervise the departure of passengers from the car without leaving the station at which he collects the fares of entering passengers.

The invention also includes other improvements in the construction and arrangement of street cars which will be referred to hereinafter.

Figure 1:
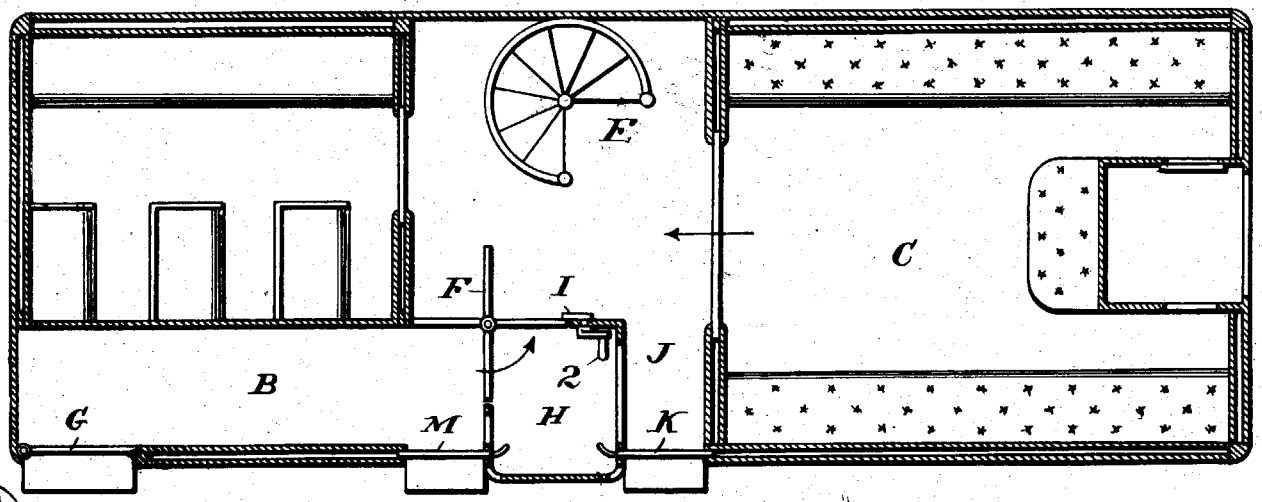
Figure 2:
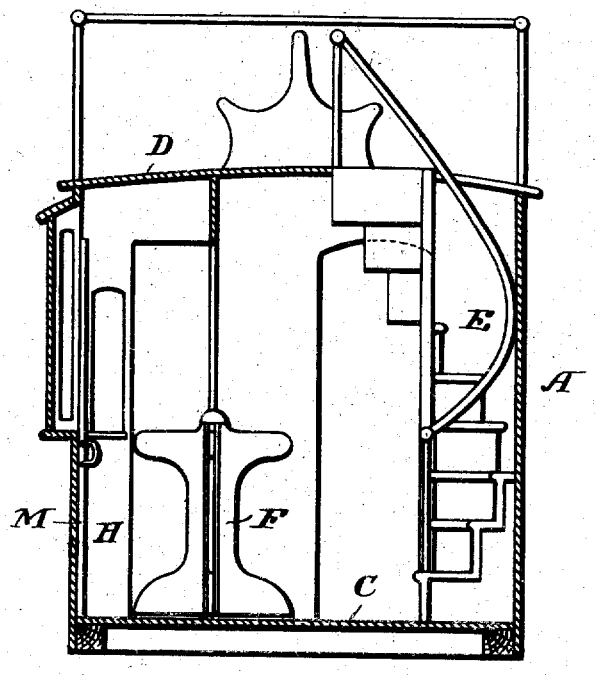

In the accompanying drawings,—Figure 1 is a plan view of a street car illustrating one embodiment of my invention; and Fig. 2 is a sectional elevation thereof looking in the direction of the arrow as shown on Fig. 1.

The body A of the car may be of any usual or suitable construction and proportions, is provided with seats suitably arranged, and preferably has both a lower deck C and an upper deck D, communicating through the medium of a stairway E, shown as a spiral stairway, leading upward from the interior of the body of the car—that is, so that access can only be had thereto after the passenger has entered the car and paid his fare and has been registered.

To secure the certain or automatic registry of each passenger, the car is provided with a registering-turnstile F, which must be passed and operated before a passenger can obtain access to the body of the car. This turnstile should turn only in one direction—that is to say, inward. As a number of passengers often board a car at the same point and it would not be advisable, or in many cases permissible, to let the car remain stationary while the passengers are paying their fares and passing the turnstile, I arrange the turnstile in a passage-way or compartment B at one side of the car and into which the passengers may enter freely—as, for instance, through the door G. As shown, this compartment B is in the form of a corridor arranged within and extending a suitable distance along one side of the car and is of such capacity as to admit a number of persons at one time, so that all desiring passage can enter the receiving compartment without material delay, permitting the car to be started onward after they have thus entered the corridor or compartment and to continue its movement while the passengers are successively passing the turnstile and are being registered thereby. It will thus be seen that the registering of each fare is insured without delaying the entrance of passengers or the progress of the car.

The conductor might of course collect the fares by making the customary rounds after the passengers have entered and registered; but preferably there is provided a conductor's box or station H adjacent to the turnstile F, with a window opening into the corridor or compartment, through which the fare can be collected, and a detent I serves as a means of preventing the rotation of the turnstile until released by the operating of a handle 2 by the conductor.

The outlet J is shown arranged adjacent to the conductor's station and is controlled by the conductor. As shown, the outlet is provided with a sliding door K, which the conductor can open by drawing it inward. If a swing-door be used, it should swing only outward, so that passengers could not by entering the car at this point evade the turnstile F. By this arrangement the exit of each passenger takes place directly under the conductor's eye and control and the danger of a premature starting-signal, with resulting injury to passengers, is obviated.

An additional door M may be provided in the side of the car close to the turnstile and conductor's box for use in permitting the exit of passengers who after entering the corridor discover that they have boarded the wrong car or in any other unusual circumstance or emergency.

It will be seen that by the above arrangement every passenger entering the body of the car is registered without possibility of mistake or deception on the part of the conductor, who is in a position to control both the admission and exit of the passengers, and that the capacity of the car is practically doubled by providing an upper deck without possibility of access thereto until fare has first been paid and registered.

It is obvious that under such an arrangement as is herein shown and described, whereby fares are paid upon entering the car, the use of a two-story or double-decker car on a busy line becomes at once practicable, inasmuch as the conductor is thus relieved of the necessity of mounting a stairway in order to collect fares on the upper deck and while thus engaged of being prevented from attending to his duties below, including proper signaling to the motorman or driver.

As best shown in Fig. 1, the body of the car is divided by partitions having sliding doors, so that one compartment may be for first-class fares and the other for second-class fares or smokers.

It will be seen that I dispense entirely with the usual platforms and provide the car with seating space extending to its extreme ends. For any given length of car the seating space is thus very largely increased over the types of cars heretofore used. It will also be noted that the corridor B does not materially reduce the seating capacity of the car, although it may provide room for more than the average number of passengers entering it at any one time. Notwithstanding the increased capacity of a car of given size embodying my invention, the cost of construction is largely reduced by reason of dispensing with the platforms, which are more expensive to construct than equal portions of the car bodies.

While the registering turnstile is useful as a check upon the conductor, it will be evident that the corridor arrangement may be employed without the turnstile, as the conductor can readily collect the fares as the passengers pass his station in entering the body of the car from the corridor.

Without limiting myself to the construction and arrangement shown, I claim:

1. A street car provided with a receiving compartment extending along one side thereof, an entrance thereto, a registering turnstile between said compartment and the body of the car and an exit therefrom, substantially as set forth.

2. A street car provided with a receiving compartment extending along one side thereof, an entrance door thereto, a registering turnstile between the compartment and the body of the car, and a conductor's box or station adjacent to the turnstile, substantially as set forth.

3. A street car provided with an entrance door, a receiving compartment extending along one side of the car and communicating with the door, and a passage from the compartment to the body of the car provided with a registering turnstile, substantially as set forth.

4. A street car provided with an entrance door, a receiving compartment, a passage from the compartment provided with a registering turnstile, a conductor's station adjacent to the said passage, and an outlet having a door controlled by the conductor, substantially as set forth.

5. A street car provided with an entrance door, a receiving compartment communicating therewith and extending along one side of the car, a passage from the compartment provided with a registering turnstile, a conductor's station adjacent to said passage, and a detent whereby the conductor can secure and release the turnstile, substantially as set forth.

6. A street car provided with an entrance door, a receiving compartment communicating therewith, a passage from the compartment provided with a registering turnstile, a detent whereby the conductor can secure and release the turnstile, and an outlet from the body of the car having a door controlled by the conductor, substantially as set forth.

7. A street car provided with an entrance door, a receiving compartment communicating therewith and extending along one side of the car, a passage from the compartment provided with a registering turnstile, a detent whereby the conductor can secure and release the turnstile, and an outlet from the body of the car having a door controlled by the conductor, substantially as set forth.

8. A street car having lower and upper decks, a staircase between the same leading from the interior of the car, an entrance door, a side receiving compartment communicating therewith and with the interior of the car, and a passage between said compartment and the interior of the car provided with a registering turnstile, substantially as set forth.

9. A street car having a side corridor separated from the body of the car, a passenger entrance to said corridor near one end thereof, an exit passage from the other end of the corridor into the body of the car, and a station for a conductor at the latter end of the corridor, for the purpose set forth.

10. A street car having a side corridor extending from one end of the car toward the middle thereof, a passenger entrance to said corridor near the end of the car, an exit passage from the other end of the corridor to the body of the car, and a station for a conductor at the latter end of the corridor, for the purpose set forth.

11. A street car having seating space extending to the ends thereof, a side corridor separated from the body of the car, an entrance for passengers at one end of the corridor, and a station for a conductor at the other end of the corridor, the latter end of the corridor communicating with the body of the car.

12. A street car having seating space extending to the ends thereof, a corridor extending along one side of the car at one end thereof, an entrance for passengers at one end of said corridor, a station for a conductor at the other end thereof, and an opening from the corridor to the body of the car adjacent the said conductor's station.

13. A street car having a side corridor separated from the body of the car, an entrance for passengers at one end of the corridor, a station for a conductor at the other end of the corridor, an opening between the corridor and the body of the car adjacent the conductor's station, and an exit from the body of the car also arranged near the conductor's station.

14. A street car having at one side a station for a conductor, a corridor along the same side of the car, an entrance to the corridor for entering passengers, a passage from said corridor to the body of the car arranged adjacent to the conductor's station, and exit openings from the body of the car and the corridor, said openings being adjacent the conductor's station, for the purpose set forth.

15. A street car having its body divided into a plurality of compartments and having a side corridor separated from said compartments, an entrance at one end of said corridor, a passageway or opening from the corridor to the body of the car, and a conductor's station arranged adjacent to said passage or opening.

In testimony whereof I affix my signature in the presence of two witnesses.

CHARLES B. PRICE.

Witnesses:
Wm. M. Duff,
A. E. Patterson.